United States Patent [19]

Swan

[11] Patent Number: 4,832,373

[45] Date of Patent: May 23, 1989

[54] SELECTIVE DATA BLOCKING OVERLAY

[75] Inventor: Larry G. Swan, Albuquerque, N. Mex.

[73] Assignee: Patricia A. Swan, St. George, Utah

[21] Appl. No.: 54,611

[22] Filed: May 27, 1987

[51] Int. Cl.[4] ...................... B42D 15/00; G09B 19/22; G02B 7/02; B05D 5/06

[52] U.S. Cl. .................................. 283/115; 283/48.1; 350/250; 428/167

[58] Field of Search .............. 283/1 A, 94, 109, 48 R; 434/178, 346, 348; 235/495; 427/259; 428/343, 167; 132/88.5; 40/489, 490; 350/440, 250, 241

[56] References Cited

U.S. PATENT DOCUMENTS

| | | | |
|---|---|---|---|
| 1,548,487 | 8/1925 | Ross | 283/48 R |
| 2,531,148 | 11/1950 | Madison | 434/348 |
| 3,230,641 | 1/1966 | Sloves | 434/348 |
| 3,287,827 | 11/1966 | Lippman | 434/348 |
| 3,409,347 | 11/1968 | Vogel | 350/250 |
| 3,719,801 | 3/1973 | Drexler | 235/61.12 N |
| 3,739,739 | 6/1973 | Brase | 434/178 |
| 3,859,632 | 1/1975 | Etter | 340/146.3 SY |
| 4,255,653 | 3/1981 | Borkat et al. | 235/495 |
| 4,346,697 | 8/1982 | Cohen | 283/1 A |
| 4,465,729 | 8/1984 | Cancio et al. | 428/167 |
| 4,544,360 | 10/1985 | Goodman | 434/178 |
| 4,559,705 | 12/1985 | Hodge et al. | 283/1 A |
| 4,607,433 | 8/1986 | Meeker | 33/1 BB |

*Primary Examiner*—Donald R. Schran
*Assistant Examiner*—Paul M. Heyrana, Sr.
*Attorney, Agent, or Firm*—Deborah A. Peacock; Robert W. Weig

[57] ABSTRACT

The invention relates to an overlay for selectively blocking out or covering unwanted information or data on a page having a predetermined layout, such as a television program listing or guide, a class schedule, or a public transportation schedule. The overlay comprises a substantially transparent sheet alignable on the page with indicia and data blocking areas corresponding to indicia and bodies of data of the predetermined layout. The overlay may be partitioned by lines to predefine the data blocking areas. Strips of precut adhesively backed paper or other material sized to fit over selected data blocking areas are attachable on the sheet as desired by a user to cover or block out unwanted information, such as programming unwanted or unreceivable by the user.

11 Claims, 4 Drawing Sheets

SELECTIVE DATA BLOCKING OVERLAY

BACKGROUND OF THE INVENTION

Users of frequently referred to publications such as programming guides, schedules and directories are confronted with unwanted data or information which is repeatedly perused by such users who often want only to view and consider selected data within the publication. For example, a user of a television programming guide, such as *TV Guide*® *Magazine*, published by Triangle Publications, Inc., in Radnor, Penn., may only receive certain television stations included within a large number of listed stations. Moreover, a user may not wish to view the telecasts of certain stations. Typically, such publications are periodicals issued in a predetermined layout. The present invention provides users of such publications with an overlay which may be selectively adjusted by an individual user to meet his or her specific needs or desires.

SUMMARY OF THE INVENTION

In accordance with the present invention, there is provided an overlay for selectively blocking out or covering unwanted information on a page containing indicia and bodies of data related thereto in a predetermined layout. A substantially transparent sheet comprises indicia positioned to superpose corresponding indicia on the page and a plurality of predefined data covering areas corresponding to bodies of data in the predetermined layout.

In the preferred embodiment, relatively opaque data blocking elements are positionable on and attachable to the sheet on the predefined data covering areas whereby unwanted information on the page can be selectively blocked out. The data blocking elements can be adhesively attachable to the sheet and may be removable and reusable. The data blocking elements can be precut to fit corresponding bodies of data.

In an alternative embodiment, the data blocking elements are positioned on and made integral with the transparent sheet in a predetermined pattern. This embodiment is useful, for instance, when users in an entire community, region or specialty need the same data blocked out.

The page may be a television program listing and the indicia on the sheet can be television program listing indicia. Data covering areas on the transparent sheet can correspond to bodies of program data in such a television program listing. Overlay alignment and data covering areas can be provided with lines on the sheet. Lines on the sheet can superpose corresponding lines on a page.

One object of the present invention is to block out unwanted or unneeded information from a page of a publication.

Another object of the present invention is to provide user adjustable selective information blocking.

One advantage of the present invention is that in accordance therewith, a user may quickly discern information to be perused in a publication.

Another advantage of the present invention is that it is inexpensive to manufacture, easy to use and long lasting.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the specification and appended claims.

BRIEF DESCRIPTION OF THE DRAWING

The accompanying drawing, which is incorporated in and forms a part of the specification, illustrates several embodiments of the present invention and, together with the description, serves to explain the principles of the invention. In the drawing.

DESCRIPTION OF THE PREFERRED EMBODIMENTS OF THE INVENTION

This invention relates to an overlay having data blocking elements for blocking out unwanted data or information on a page having a predetermined layout.

Figure 1:
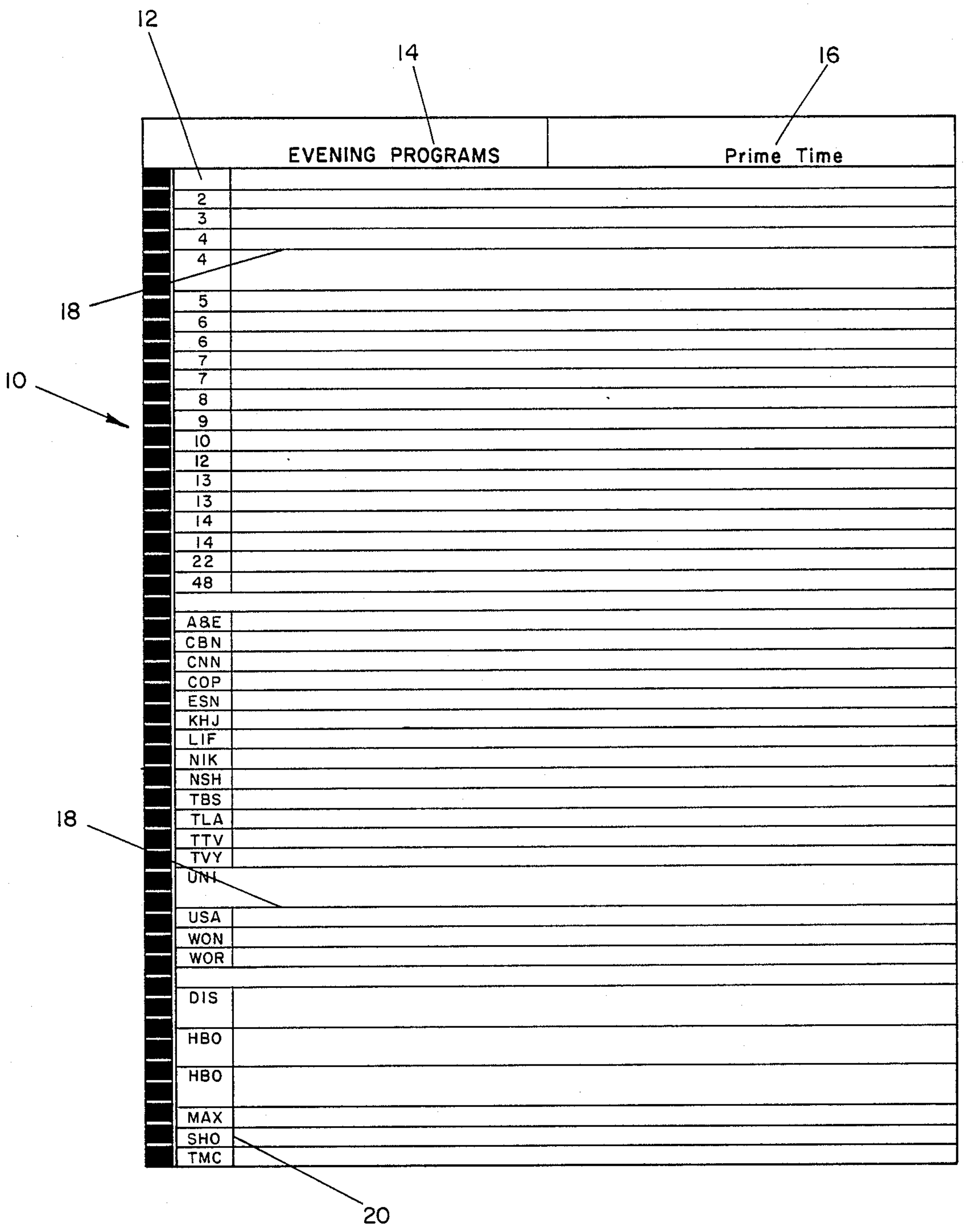
FIG. 1 of the drawing illustrates a substantially transparent sheet in accordance with the preferred embodiment of the invention.
Figure 2:
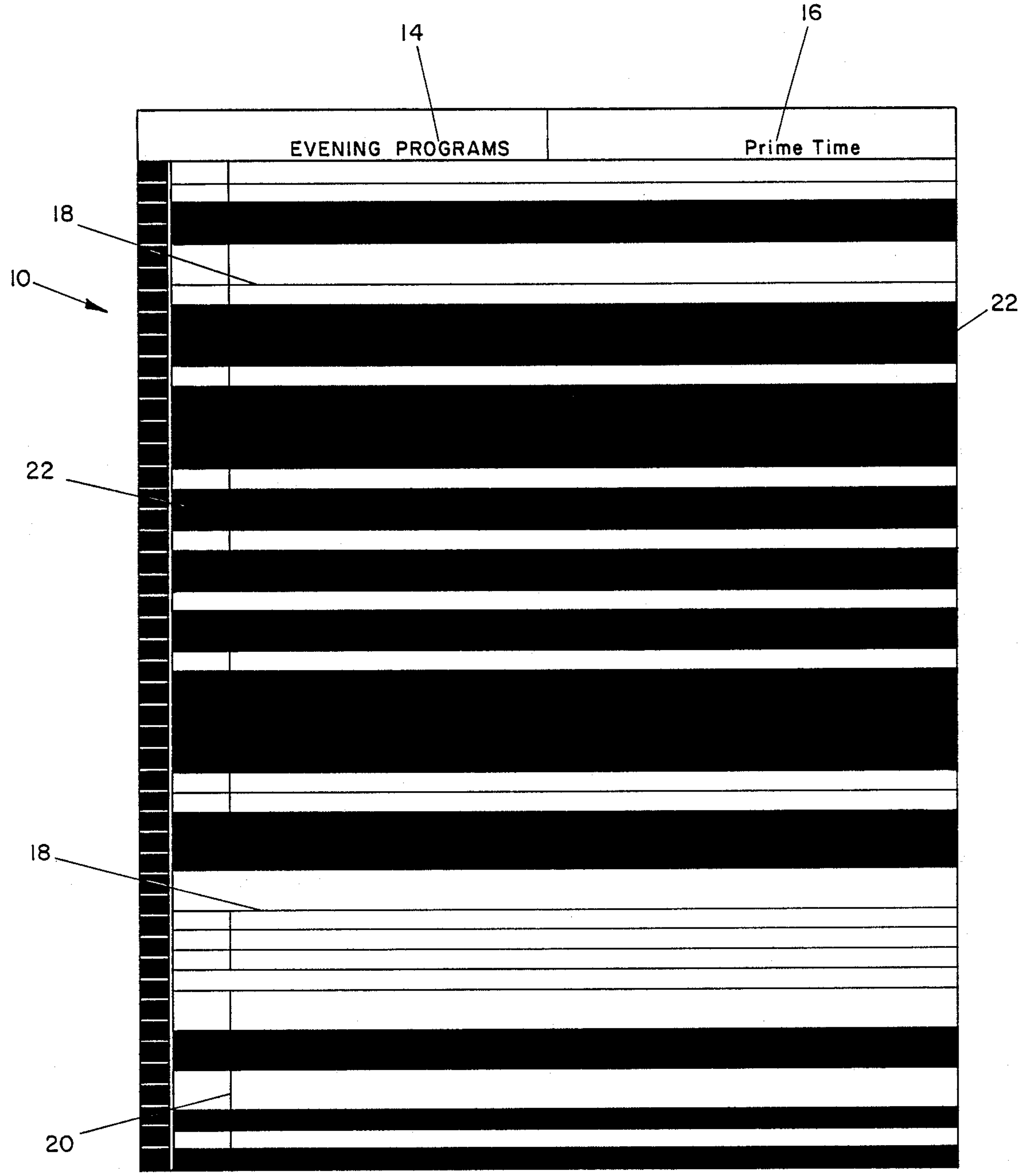
FIG. 2 of the drawing shows the sheet of FIG. 1 with data blocking elements positioned thereon to block out selected areas on the sheet.
Figure 3:
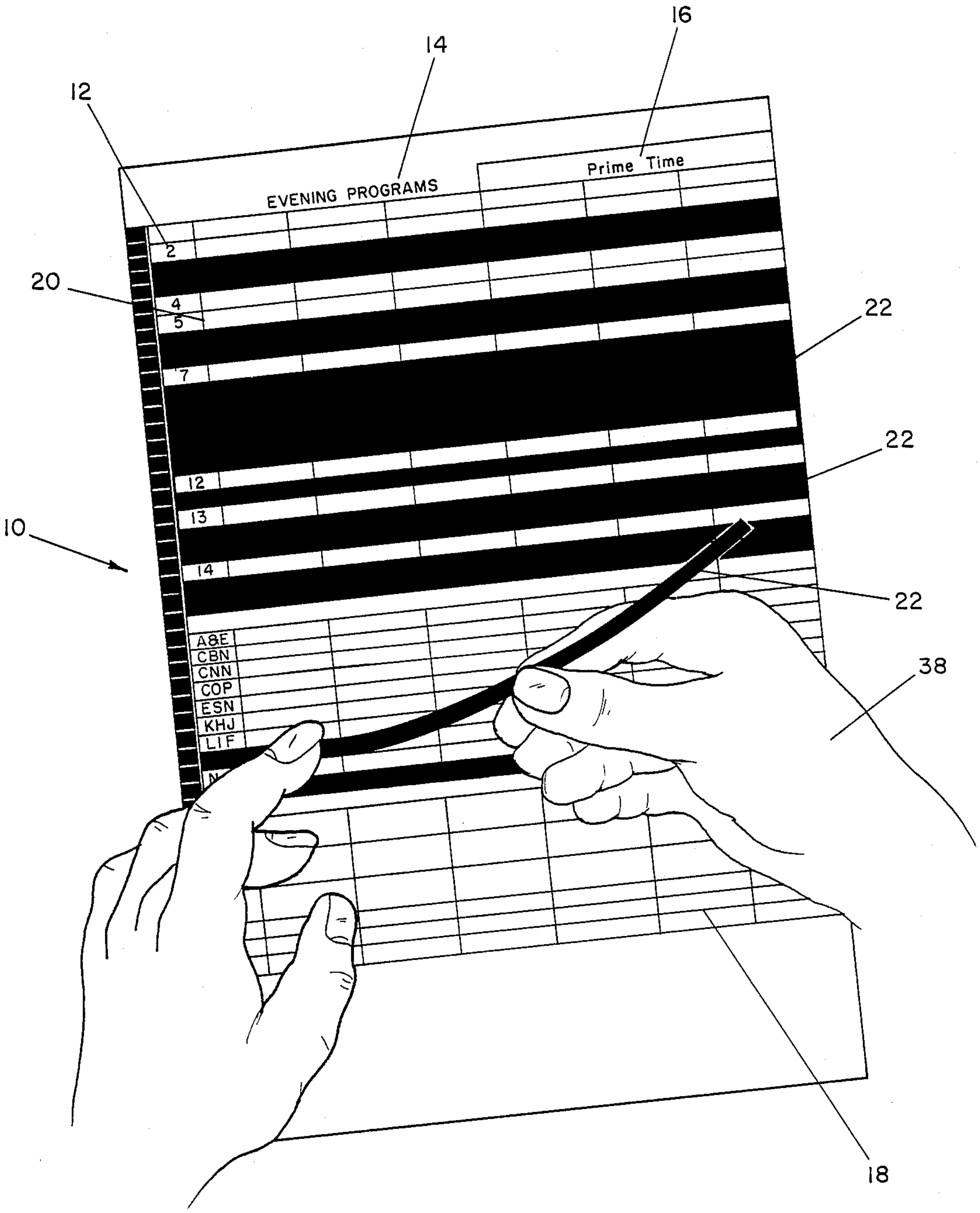
FIG. 3 of the drawing illustrates the transparent sheet or overlay of FIG. 1 and a user attaching precut data blocking elements on selected data covering areas of the sheet to cover or block out unwanted information.
Figure 4:
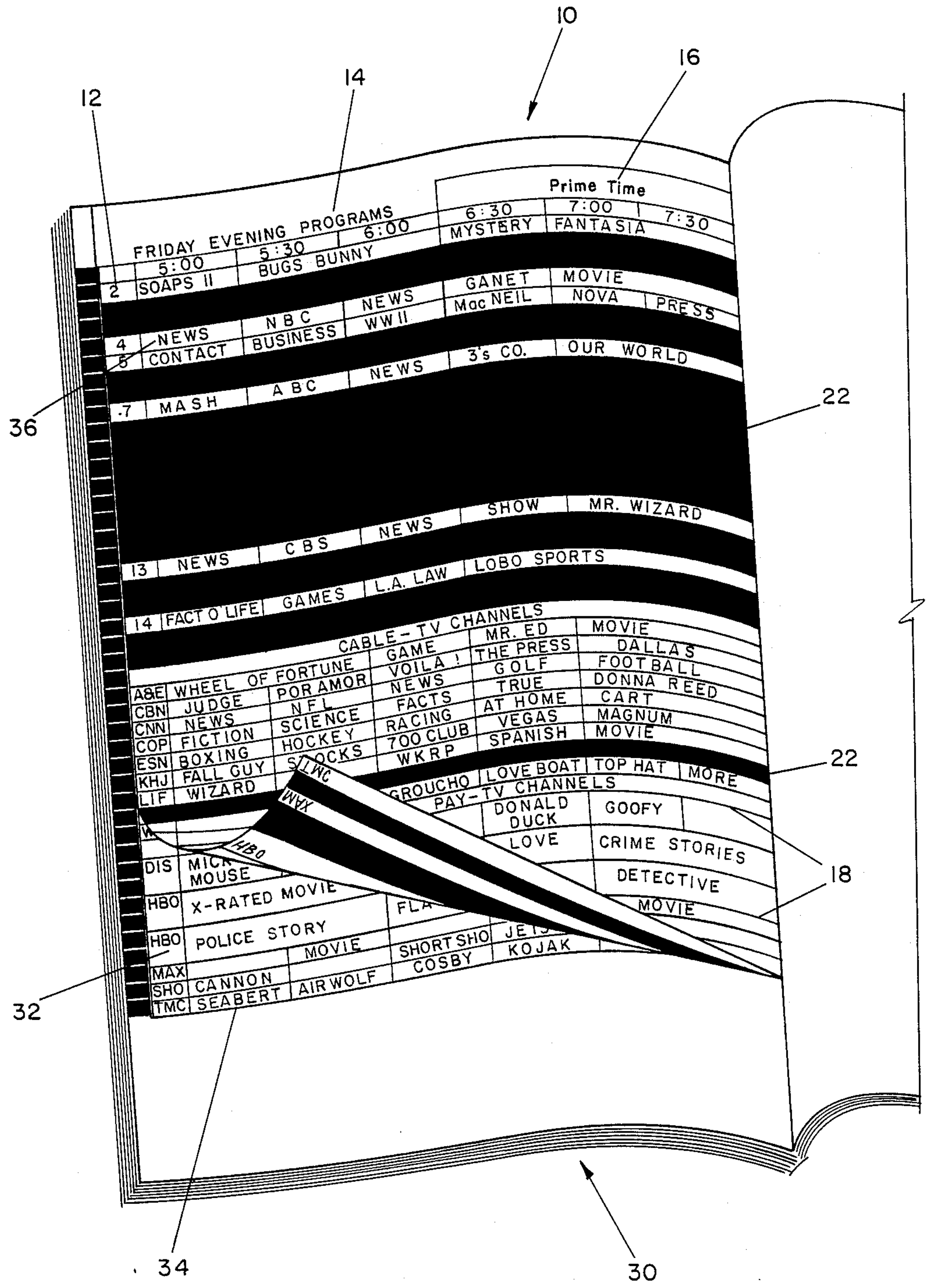
FIG. 4 of the drawing illustrates indicia of the FIG. 3 sheet or overlay partially superposed over corresponding indicia on a page of a television program listing publication to block out unwanted or unneeded information on the page.

Reference is now made to FIGS. 1–4 of the drawing which show a substantially transparent sheet 10 having indicia 12, 14 and 16 and horizontal lines 18 and vertical line 20 printed thereon. This indicia shown in FIGS. 1–4 corresponds substantially to the indicia contained on a typical page 30 of *TV Guide*® *Magazine* and other television program listings showing television programs for a particular day. The transparent sheet 10 may be comprised of a non-tinted sheet of plastic or glass or may be tinted with color appealing to a user. The indicia and lines may be black or any combination of colors to suit the user. The indicia and lines are positioned so that the sheet will overlay a publication such as a television program listing 30. For example, as shown in FIG. 4, the indicia 12 may superpose channel designations or numbers 32 on the program listing page 30 and the indicia 14 and 16 may superpose time of day or other designations. FIGS. 1, 3 and 4 show channel numbers as indicia 12 on the transparent sheet 10 whereas FIG. 2 shows a blank column. The line 20 may superpose a corresponding line 34 in the publication and thereby, in combination with the lines 18 on the transparent sheet 10, designate blocks for station identification letters. The lines 18 may superpose corresponding lines 34 in the publication 30 which separate information relating to television programs 36 for the various stations 32 identified by the indicia on the publication's page 30 corresponding to the indicia 12 on the transparent sheet 10. In this manner, the lines 18 predefine areas on the transparent sheet 10 which overlay bodies of data within the publication 30. The indicia and lines can be used to align the sheet over a page of the publication. It will be appreciated that information layout varies with the particular publication to be used and that a transparent sheet 10 will be fabricated for use with the information layout of a particular publication one of which publication, a sample television program listing 30, is shown in FIG. 4.

As seen in FIG. 3 of the drawing, the transparent sheet 10 is used with relatively opaque data blocking elements 22 which can be precut to fit areas defined by the lines 18 for a particular publication and provided in a kit to a user, if desired. Alternatively, a user can be supplied with suitable material to fabricate data blocking elements 22 himself or herself. In the preferred embodiment, data blocking elements 22 are constructed of an opaque or relatively opaque material, such as paper, and are removably attached to the transparent sheet 10 with an adhesive backing. Data blocking elements 22 are preferrably provided in a kit, precut and peelable, from a suitable support sheet. Alternatively, a user may cut from a support sheet, his or her own data blocking elements 22 to fit the areas of sheet 10 he or she wants to block out or cover. Data blocking elements 22 may be entirely opaque to completely block out the data, or tinted so that information underlying some or all of the data blocking elements 22 may be read if desired.

In practice, such as illustrated in FIG. 3, a user 38, after acquiring a suitable transparent sheet 10, may construct an overlay by first determining, for example, in a television program listing publication 30, which stations 32 he or she does not receive or which stations he or she does not wish to consider watching, among those listed in the publication 30. The user 38 then selects the appropriate, preferably precut, data blocking elements 22 from a supply sheet, and attaches them on the transparent sheet 10 within the appropriate selected areas as predefined by the lines 18. The user may alternatively cut data blocking elements 22 from a supply sheet not having precut elements. The supply sheet may provide precut data blocking elements 22 in the order that corresponding bodies of data appear in the publication, as a matter of convenience. Once the user 38 has blocked out selected areas on the transparent sheet 10 with data blocking elements 22, as shown in FIG. 3, the overlay is ready for use. The user superposes the indicia on the overlay over corresponding indicia on the page such as shown in FIG. 4. Unwanted and unneeded information is blocked out by the data blocking elements 22 applied to the transparent sheet 10 and a suitable program or other selection can readily be made. If a user later wishes to change the areas of information blocked out, he or she need only remove certain selected data blocking elements 22 or apply additional data blocking elements 22 where desired.

In an alternative embodiment of the invention also represented by FIG. 2 of the drawing, the data blocking elements 22 are preprinted or prepositioned on the transparent sheet 10 so that the overlay can be immediately used. This embodiment is useful when a large number of users require blocking out of the same data. For example, an overlay with prepositioned data blocking elements 22 which block all of the cable television station program listings for a particular television program listing publication could be used by many people in a particular location, such as a city, who do not receive cable television programs. Additional data blocking elements 22 could be provided to these users so that even more television station program listings could be blocked out.

Those skilled in the art will recognize that portions of the overlay may be color coded with transparent overlay elements or tinted by a manufacturer or user with dyes to suit a particular need, such as to distinguish cable from local stations or movie, sports and news stations. Data blocking elements 22 of differing colors may also be used to designate unwanted versus unreceivable channels or to otherwise distinguish blocked out data or information. Clips or other positioning devices and guides may be used to retain the position of the overlay on a page. The size of the transparent sheet 10 may exceed the size of the publication page in one or more directions so that the overlay may additionally serve as a place marker and so that the publication can be closed and a particular page easily found again. Additional information may be placed on the overlay within such an extended area. Too, a tab may be provided on the overlay to serve as a place marker. If the transparent sheet 10 is made of a durable plastic material, it can be washed for longer use. In an alternative embodiment, the transparent sheet 10 may be made of a magnifying-type material so that the visually impaired may better view data through the overlay.

The invention has been described in detail with particular reference to preferred embodiments thereof, but it will be understood that variations and modifications can be effected within the scope of the invention.

What is claimed is:

1. An overlay for selectively blocking out visually undesired information on a page, the page containing predetermined bodies of data and indicia related thereto in a predetermined layout, said overlay comprising:

a substantially transparent sheet, said transparent sheet having provided thereon alignment means comprising a duplication of selected indicia positioned on said transparent sheet to substantially superpose at least a portion of corresponding indicia on the data-and-indicia-containing page, said transparent sheet further comprising a plurality of predefined data covering areas corresponding to the bodies of data in the predetermined layout of the page;

data blocking means being positionable on said transparent sheet on selected predefined data covering areas thereof to obscure the visually undesired information on the page underneath said selected predefined data areas when said overlay is superposed over the page; and means for attaching said data blocking means to said transparent sheet on said selected predefined data covering areas whereby the visually undesired information on the page can be selectively and substantially blocked out when said overlay is superposed over the page.

2. The invention of claim 1 wherein said data blocking means are relatively opaque.

3. The invention of claim 1 wherein said data blocking means are removably attachable to said substantially transparent sheet.

4. The invention of claim 3 wherein said data blocking means are adhesively attachable to said substantially transparent sheet.

5. The invention of claim 1 wherein said data blocking means are precut to be positionable on said transparent sheet on said selected predefined covering areas to substantially obscure the visually undesired information underneath said selected predefined data areas when said overlay is superposed over the page.

6. The invention of claim 1 wherein said alignment means on said substantially transparent sheet further comprises lines predefining said plurality of data covering areas.

7. The invention of claim 6 wherein said lines of said alignment means on said transparent sheet superpose at least a portion of corresponding lines on the page when said overlay is superposed over the page, the corresponding lines separating the bodies of data within the predetermined layout on the page.

8. The invention of claim 1 wherein said data blocking means comprises elements individually sized to fit over associated data covering areas predefined by said alignment means.

9. The invention of claim 1 wherein said transparent sheet is made of a magnifying-type material.

10. A kit for building an overlay for selectively blocking out visually undesired information on a page, the page containing predetermined bodies of data and indicia related thereto in a predetermined layout, said overlay kit comprising:

a substantially transparent sheet, said transparent sheet having provided thereon alignment means comprising a duplication of selected indicia positioned on said transparent sheet to substantially superpose at least a portion of corresponding indicia on the data-and-indicia-containing page, said transparent sheet further comprising a plurality of predefined data covering areas corresponding to the bodies of data in the predetermined layout of the page;

a plurality of data blocking elements corresponding to said predefined data covering areas to obscure the visually undesired information on the page underneath said predefined data areas when said overlay is superposed over the page; and means for attaching selected data blocking elements to said transparent sheet on said corresponding predefined data covering areas, whereby visually undesired information on the page can be selectively and substantially blocked out when said overlay kit is superposed over the page.

11. An overlay for selectively blocking out visually undesired information on a page, the page containing television station program listings and other predetermined indicia related thereto in a predetermined layout, said overlay comprising:

a substantially transparent sheet, said transparent sheet having provided thereon alignment means comprising a duplication of selected indicia positioned on said transparent sheet to substantially superpose at least a portion of corresponding indicia on the television station program listing and other indicia containing page;

said transparent sheet further comprising a plurality of predefined data covering areas corresponding to the television station program listings in the predetermined layout of the page to obscure the visually undesired television station program listings and other indicia on the page underneath said selected predefined data areas when said overlay is superposed over the page; and said transparent sheet further comprising data blocking means being positioned on said transparent sheet on preselected data covering areas whereby visually undesired television station program listings and other indicia on the page can be selectively and substantially blocked out when said overlay is superposed over the page.

* * * * *